US008542790B2

(12) United States Patent
Dorosko et al.

(10) Patent No.: US 8,542,790 B2
(45) Date of Patent: Sep. 24, 2013

(54) JET PUMP INSPECTION APPARATUS

(75) Inventors: Robert K. Dorosko, Wilmington, NC (US); Jason Shawn Bates, Lynchburg, VA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 602 days.

(21) Appl. No.: 12/851,910

(22) Filed: Aug. 6, 2010

(65) Prior Publication Data

US 2012/0033777 A1    Feb. 9, 2012

(51) Int. Cl.
*G21C 17/00*    (2006.01)

(52) U.S. Cl.
USPC .......................................... 376/245; 376/392

(58) Field of Classification Search
USPC .................................... 376/245, 372
See application file for complete search history.

(56) References Cited

U.S. PATENT DOCUMENTS

| H1262 H * | 12/1993 | Bacvinskas et al. .......... 376/252 |
| 6,076,407 A | 6/2000 | Levesque et al. |
| 7,543,512 B2 | 6/2009 | Smith et al. |
| 2006/0227921 A1* | 10/2006 | Smith et al. .................. 376/260 |
| 2008/0217321 A1* | 9/2008 | Vinegar et al. ................ 219/492 |
| 2010/0150299 A1* | 6/2010 | Ito et al. ........................ 376/372 |

\* cited by examiner

*Primary Examiner* — Timothy A Brainard
(74) *Attorney, Agent, or Firm* — Harness, Dickey & Pierce

(57) ABSTRACT

Example embodiments are directed to jet pump inspection apparatuses including an encoded probe driver coupled to a guide funnel. In an example embodiment, the encoded probe driver and the guide funnel are located on the body of the apparatus in order to decrease the time required for inspection, thereby limiting exposure to personnel of radioactive contamination.

19 Claims, 6 Drawing Sheets

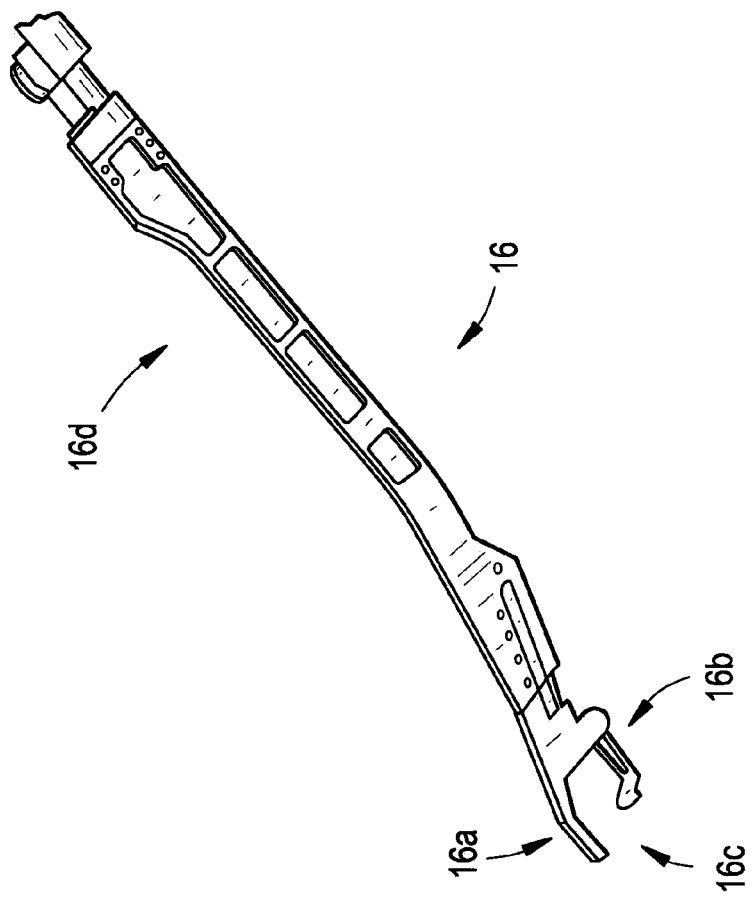

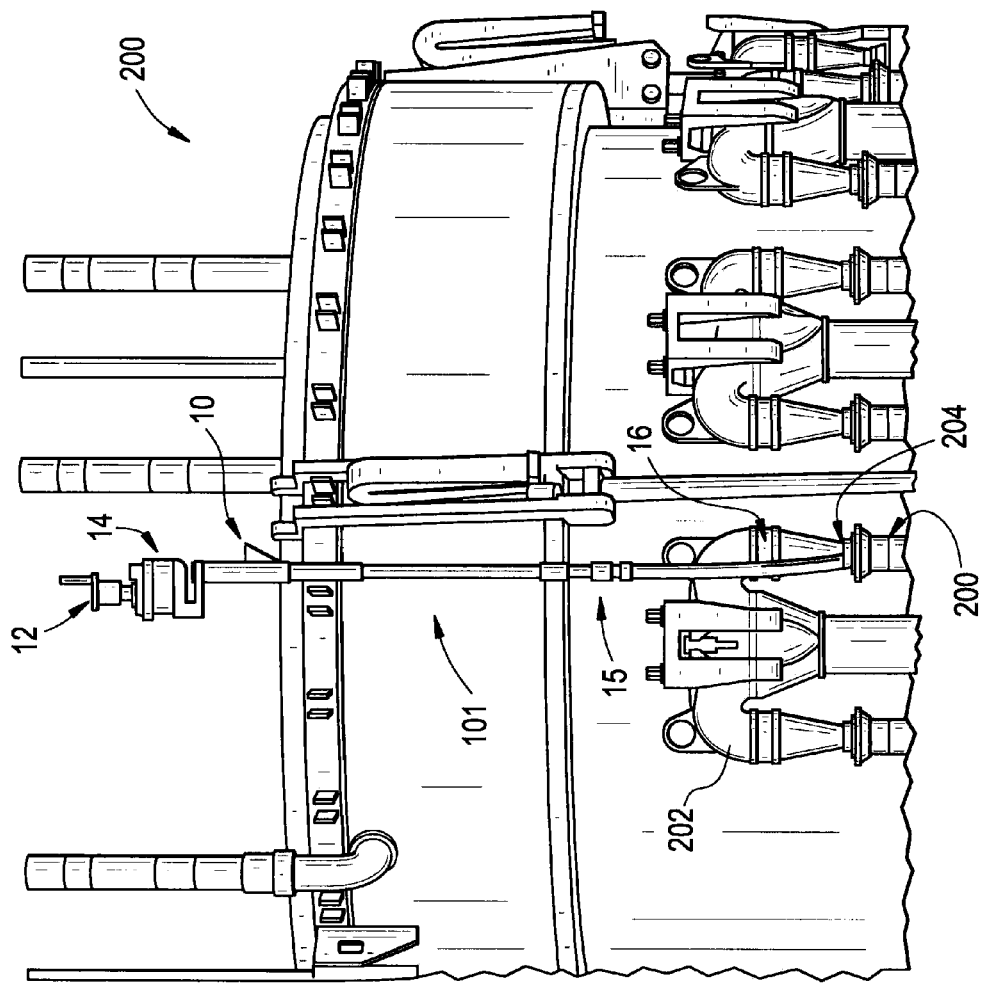

JET PUMP INSPECTION APPARATUS

BACKGROUND

1. Field

Example embodiments generally relate to a jet pump inspection apparatus including an encoded probe driver coupled to a hybrid form guide funnel that introduces probe cable assemblies to boiling water reactor (BWR) jet pump assemblies.

2. Description of Related Art

Bores such as pipes or cylindrically shaped equipment are often submerged in a pool of water or other liquid. There is often a need to have a maintenance tool or inspection probe delivered into the submerged bore. For example, a reactor pressure vessel (RPV) of a boiling water reactor (BWR) typically has submerged bores that need to be inspected during maintenance routines. Hollow tubular jet pumps having internal bores are positioned within an annulus to provide the required reactor core water flow. The jet pump includes an upper portion, known as the inlet mixer, and a lower portion, known as the diffuser. The inlet mixer and the diffuser, due to their large size, are formed by welding a plurality of cylindrical and conical sections together. Specifically, respective ends of adjacent cylindrical sections are joined with a circumferential weld. During operation of the reactor, the circumferential weld joints may experience inter-granular stress corrosion cracking (IGSCC) and irradiation assisted stress corrosion cracking (IASCC) in weld heat affected zones. This can diminish the structural integrity of the jet pump.

It is important to examine the welds of the jet pump inlet mixer and diffuser periodically to determine whether any cracking has occurred. While visual examinations in the annulus or region between a shroud and a pressure vessel wall can be performed, these examinations are likely to be only partial inspections due to access limitations in the annular region of the reactor. As such, the examination of the jet pump welds are often examined by an inspection tool positioned inside of the jet pump inlet mixer and jet pump diffuser. Such inspection tools perform ultrasonic and/or eddy current examinations of jet pump welds from inside the jet pump inlet mixer and diffuser in a nuclear reactor.

Typically, operational personnel located on a 360° service platform above the surface of the pool manipulate poles and other mechanical suspension devices to position a funnel to the inlet mixer of each jet pump to be inspected. In some cases the tool is deployed from a refuel bridge or auxiliary bridge. For a single BWR, there are typically 20 jet pumps, but a BWR can have up to 24. Prior to installing the delivery tool into the pool, the probe head with cable is loaded into the delivery tool. Once the delivery tool is positioned at the inlet of a jet pump inlet, the funnel is secured to the inlet using a pneumatic clamp. As the inlets to the jet pumps are submerged, often up to 50 feet under the surface of the pool, the manual manipulation of these poles and the funnel is difficult and time consuming.

After the tool delivery system is mated with the inlet mixer, the inspection tool or probe is lowered into a calibrated reference sleeve to calibrate the ultrasonic probes prior to inspection. The scan head is then lowered into the inlet of the pump to commence with the inspection. Once the first adjacent jet pump is inspected, the scan head is positioned into the calibration sleeve and post inspection calibration is performed. The tool delivery system is then disconnected and moved to the next pump. The attachment, calibration, insertion, and inspection operations are repeated until all jet pumps have been inspected. Often the operator will utilize at least one submerged camera to aid in the movement, manipulation, attachment, and detachment of the submerged components.

The probe driver is located as close as possible to the inlet of the pump to reduce the position error resulting from cable stretch between the positioning device and the scan head. In other systems and methods, a probe driver assembly can be located above the pool surface. Such a probe driver assembly provides for axial movement of the inserted probe by using a take-up reel and a set of pinch wheels to raise and lower the probe head. However, such systems have often been considered difficult to maintain accurate position.

As such, current systems and methods for inspecting the inside of a submerged bore such as a nuclear reactor jet pump that can be submerged 50 feet below the surface of a water pool are difficult, time consuming, and costly. Often such tasks become a critical path item during a nuclear reactor reloading process. As such, any opportunity for reducing the required time can decrease the amount of off-line or downtime of the reactor and therefore provide significant cost savings to the reactor operator as well as reduced dose to operators and technicians.

SUMMARY

Example embodiments are directed to a jet pump inspection apparatus that introduces probe cable assemblies to boiling water reactor (BWR) jet pump assemblies from a platform without the need for a submarine assembly. Advantages include allowing a probe head to be removed for servicing without the need to remove or reposition the entire delivery apparatus, tool or submersible, reduced inspection time and/or smaller footprint to impede critical path activities such as fuel moves.

Example embodiment jet pump inspection apparatuses may include an encoded probe driver and guide funnel on the body of the apparatus in order to decrease the time required for inspection, thereby limiting exposure to personnel of radioactive contamination.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 5 is an isometric view of the guide latch as illustrated in FIG. 1.

FIG. 6 is a side view of an example embodiment jet pump inspection apparatus as illustrated in FIG. 1 coupled to an inlet of a submerged nuclear reactor jet pump.

DETAILED DESCRIPTION

Detailed illustrative example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
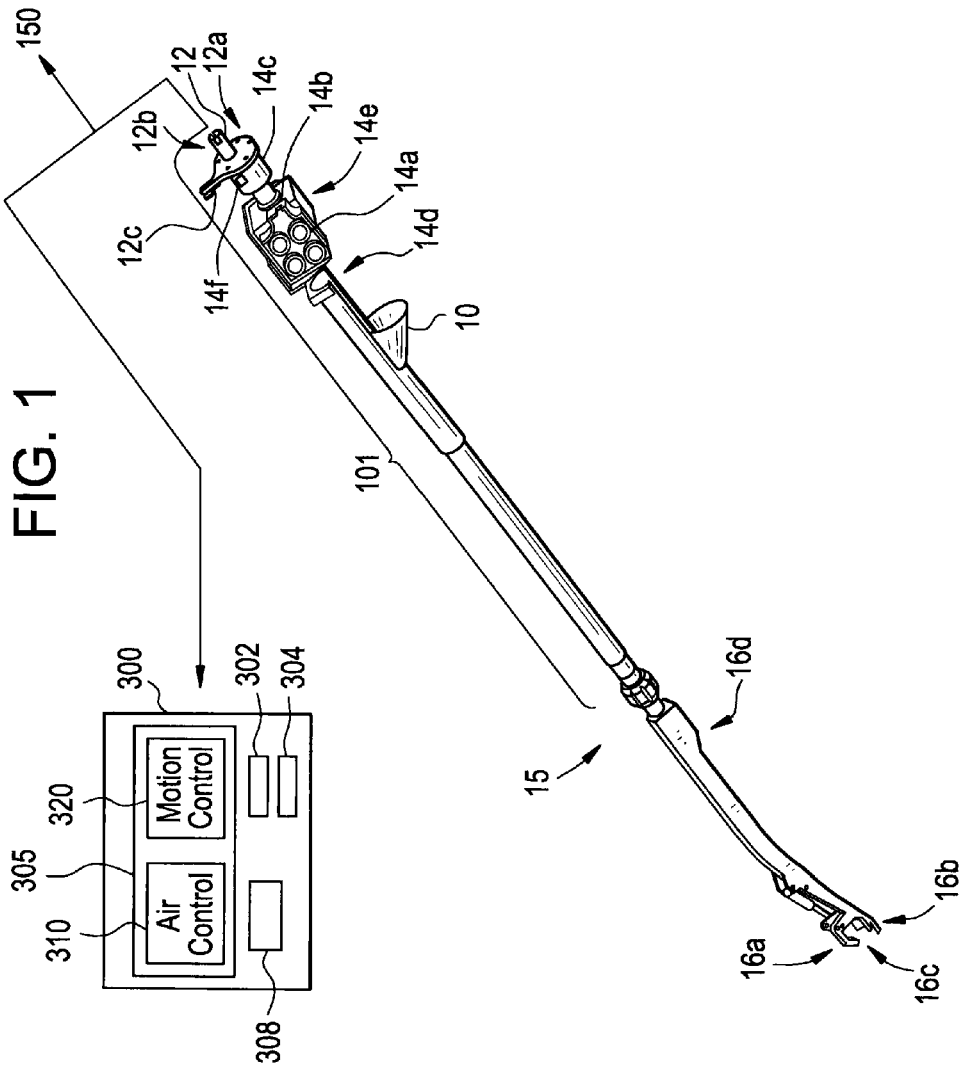
FIG. 1 is a side view of an example embodiment jet pump inspection apparatus.

FIG. 1 is a side view of an example embodiment jet pump inspection apparatus. The jet pump inspection apparatus includes a body 101. The body 101 has a pole attachment 12, a probe driver 14, a guide funnel 10, a calibration tube 15 and a guide latch 16. The body 101 may be tubular as illustrated in FIG. 1, and protects drive elements from damage during use of the apparatus. In an example embodiment, the body 101 is constructed of high strength aluminum.

The guide funnel 10, the probe driver 14 and the calibration tube 15 are located along the body 101. The pole attachment 12 is located on one end of the body 101 and the guide latch 16 is located on an opposite end of the body 101.

The functions of the jet pump apparatus are remotely controlled via a manned computer based operation console 300. The console 300 may include, for example, a central processing unit ("CPU") 305, memory unit 308, input console 304, and/or a display unit 302. The CPU 305 may be electrically connected to the memory unit 308, input console 304, and display unit 302 so as to enable communication between them. The technician manually operates the air control station 310 for pneumatic functions of the apparatus. The CPU 305 is equipped with a motion control system 320 for an encoded dc servo motor, which will be explained in further detail below. The console 300 is connected to the inspection apparatus via up to 200 feet long electrical and pneumatic umbilicals 150 to allow for remote operation by the technician.

Figure 2:
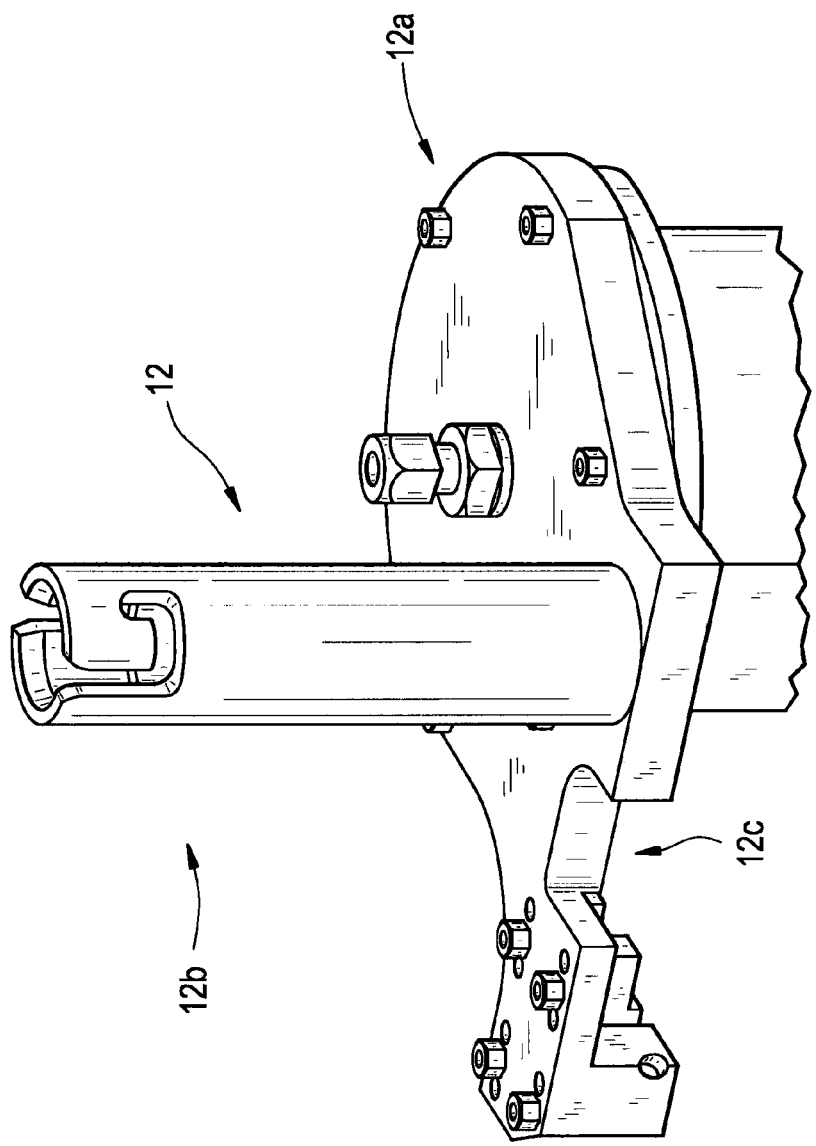
FIG. 2 is an isometric view of the pole attachment as illustrated in FIG. 1.

FIG. 2 is an isometric view of the pole attachment as illustrated in FIG. 1. Referring to FIG. 2, the pole attachment 12 is located on one end of the body 101 and allows for the jet pump inspection apparatus to connect with at least one conventional handling pole (not shown) to be handled by a technician. The pole attachment 12 is the lid of the probe driver 14, which will be described in further detail with reference to FIG. 3 below. In example embodiments, a predetermined or given number of handling poles at varying lengths will be utilized in order to deploy the jet pump inspection apparatus. The pole attachment includes a plate 12a having a plurality of bolts around the circumference of the plate 12a to connect the plate 12a to the probe driver 14 and a waterproof electrical connection in the center of the plate 12a configured to connect to a motor in the probe driver 14, which will be described in further detail below.

A connector 12b extends from the surface of the plate 12a to connect to the at least one handling pole. The connector 12b may be a hollow cylinder including a j-shaped slot interlocking with a peg of the at least one handling pole. The plate 12a may be in the shape of a disc except for an extension from the plate 12a. The extension of the plate 12a includes a slot 12c and up to four bolts along the sides of the extension for attachment to the probe driver 14. The four bolts anchor one end of a double acting pneumatic cylinder (not shown), which is remotely controlled via the air control station 310 of the console 300, within a body 14e of the probe driver 14 (see FIG. 4) that levers the probe driver 14 open and closed for loading and unloading a probe cable (not shown) into the probe driver 14. The plate 12a of the pole attachment 12 may be up to one-half an inch thick.

Figure 3:
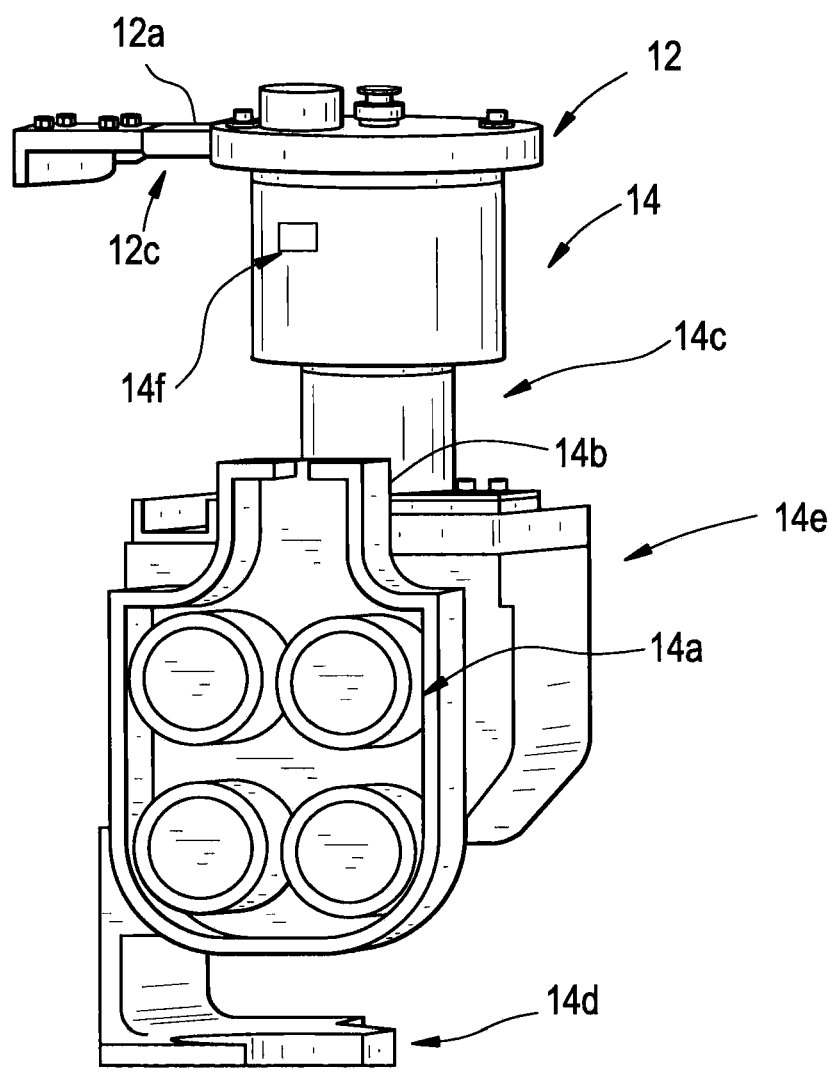
FIG. 3 is an isometric view of the probe driver coupled to the pole attachment as illustrated in FIG. 1.

FIG. 3 is an isometric view of the probe driver coupled to the pole attachment as illustrated in FIG. 1. Referring to FIG. 3, the probe driver 14 is located near one end of the jet pump inspection apparatus and includes a body 14e. The probe driver 14 provides for axial movement of a probe cable by using a set of wheels 14a to raise and lower a probe head of the probe cable. The probe cable extends from the waterproof connection of the plate 12a through the set of wheels 14a located along the side of the body 14e. The probe driver 14 extends along the entire length of the apparatus and exits through the bottom of the guide latch 16.

A separate t-hook assembly (not shown) may be optionally utilized if the probe head of the probe cable needs attention. The T-hook assembly may be deployed to help remove the probe from the probe driver 14. If the T-hook assembly 14b is utilized, the T-hook assembly 14b of the probe driver 14 can be rotated by the user to position a finger of the T-hook assembly 14b. The finger of the T-hook assembly 14b pushes the probe cable between the wheels 14a of the probe driver 14.

A slot 14b may be located above the set of wheels 14a. The probe driver 14 can provide further control of the elevation of the probe head by integration with a precision DC servo motor (not shown), which is remotely controlled via the motion control system 320 of the console 300. The motor may be equipped with a high resolution encoder 14f located within the upper most cylinder of a housing 14c of the probe driver 14. The housing 14c is connected to an upper surface of the body 14e of the probe driver 14 by a set of bolts. The upper most cylinder of the housing 14c may be larger in diameter than a lower most cylinder of the housing 14c. The encoder 14f gives the exact location of the probe head based on the number of revolutions of the motor.

In example embodiments, the probe driver 14 may have a set of wheels 14a, for example, four wheels 14a as illustrated in FIG. 3. The wheels 14a of the probe driver 14 are made of butyl rubber, joined through a common transmission that synchronously drives all of the wheels at the same rate of speed in a user defined direction (e.g., axially up/down).

The pneumatic cylinder (not shown), which is remotely controlled by the air control station 310 of the console 300, affixes from the plate 12a of the pole attachment 12 to a lever point on the wheels 14a to actuate the wheels 14a from an open to closed position allowing the probe cable to be loaded and unloaded into the probe driver 14. The guide funnel 10 includes a L-shaped bracket 14d that is configured to connect to the side of the probe driver 14.

Figure 4:
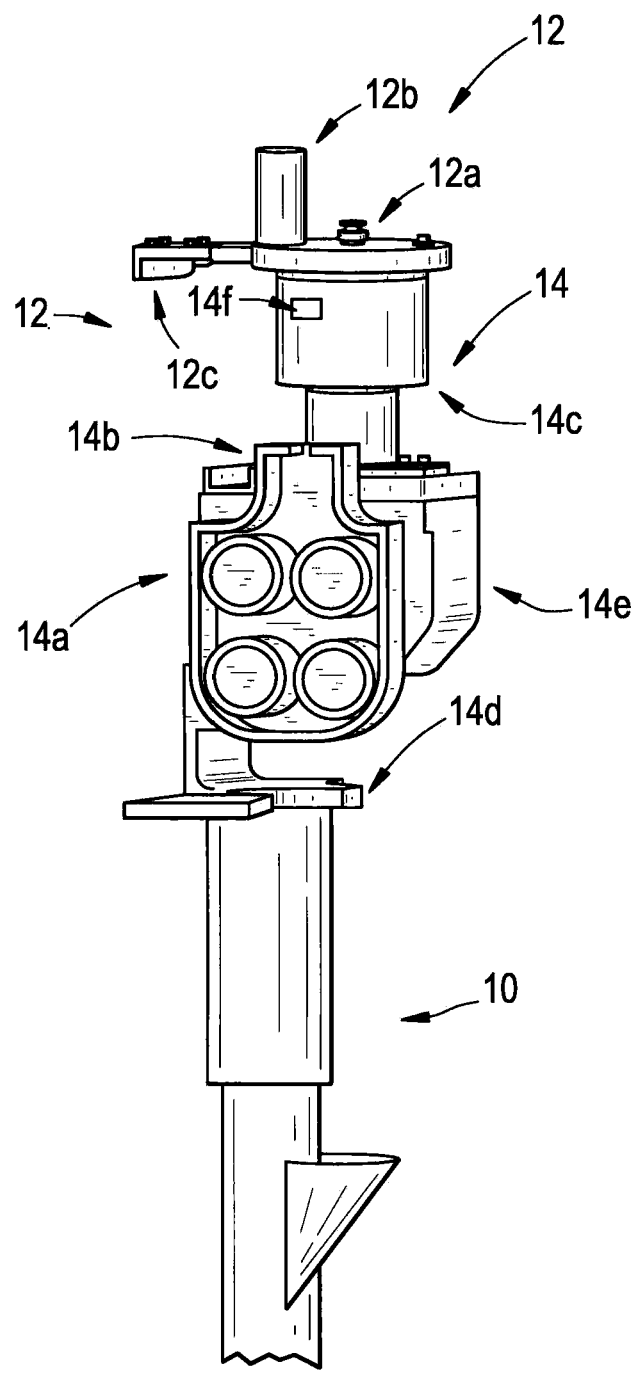
FIG. 4 is an isometric view of the pole attachment and probe driver coupled to the guide funnel as illustrated in FIG. 1.

FIG. 4 is an isometric view of the pole attachment and probe driver coupled to the guide funnel as illustrated in FIG. 1. Referring to FIG. 4, the guide funnel 10 is on the body 101 beneath the probe driver 14. The guide funnel 10 is in line with the slot 14d on the same side of the apparatus. The guide funnel 10 is used to guide the probe head of the probe cable into the tubular body 101 of jet pump inspection apparatus at a predetermined or given depth. If the probe head needs to be serviced, the jet pump inspection apparatus can remain in position due to the access to the probe head from the guide funnel 10. The T-hook assembly may facilitate removal of probe head for service and allow the inspection apparatus to remain in position.

The probe driver 14 and the guide funnel 10 are located on the body 101 (see FIG. 1) of the jet pump inspection apparatus rather than on the pool surface as in the conventional art in order to reduce errors caused by up to 50 feet of cable being stretched to the surface of the jet pump inspection apparatus. The probe driver 14 may be mounted to an inlet of a submerged nuclear reactor jet pump 202 while underwater (described below with regards to FIG. 6). After the probe head is positioned in the guide funnel 10, the T-hook 14b allows the user to guide the probe cable into the probe driver 14 as explained previously with reference to FIG. 3.

Referring back to FIG. 1, the other end of the body 101 is connected to a guide latch 16 via a calibration tube 15. The calibration tube 15 is located inline with the jet pump inspection apparatus and allows for calibration of the probes before and after a conventional scan process. The calibration tube 15 also functions as a connector that allows for the body 101 and the guide latch 16 to be disconnected. As such, the body 101 and the guide latch 16 are detachably attached to one another as will be described in more detail below.

FIG. 5 is an isometric view of the guide latch as illustrated in FIG. 1. Referring to FIG. 5, the guide latch 16 is connected to the calibration tube 15 near the bottom of the apparatus. A guide latch 16 is a clamping or engagement mechanism including one or more engagement members 16a and one or more opposing engagement members 16b. A gap 16c is formed between engagement members 16a and 16b and is configured to enclose one or more types or shapes of inlets. The engagement members 16a and 16b move together and clamp an object or surface located in gap 16c. A pneumatic or air-powered latching actuator 16d, which is near the upper surface of the guide latch 16 and remotely controlled via the air control station 310 of the console 300, engages one or both of the engagement members 16a and 16b such that one or both move together and clamps an object or surface located in gap 16c.

In practice, the engagement members 16a and 16b and latching actuator 16d are dimensioned and arranged to couple to an inlet of a submerged nuclear reactor jet pump 202 of a nuclear reactor 200, which will be described in more detail below with reference to FIG. 6. For example, in one embodiment, the latching actuator 16d is an air cylinder actuator that receives air pressure from an external source. In other embodiments, the latching actuator 16d may be a motor or similar device for closing gap 16c so that engagement members 16a and 16b compressively couple to the inlet. When actuated, the latching actuator 16d compresses the opposing engagement member 16b towards engagement member 16a to clamp onto a lip or edge of a jet pump 202 positioned within gap 16c (see FIG. 6). The encoder 14f of the probe driver 14 relays the position of the probe such that the jet pump inspection apparatus is in the proper location to attach to the jet pump inlet.

The entire jet pump inspection apparatus may weigh up to 49 pounds when dry and up to 27 pounds when wet and the entire length of the jet pump inspection apparatus may be in a range between about 119 inches-about 128 inches.

For clarity, FIG. 6 illustrates an example embodiment jet pump inspection apparatus as illustrated in FIG. 1 coupled to an inlet 204 of a submerged nuclear reactor jet pump 202 of a nuclear reactor 200. A technician located on a 360° service platform above the surface of the pool of the nuclear reactor 200 will manipulate the at least one handling pole to couple the apparatus to an inlet of each jet pump to be inspected. In some cases, the tool is deployed from a refuel bridge or auxiliary bridge. Prior to deploying the apparatus into the pool, the probe head with cable is loaded into the apparatus.

The jet pump inspection apparatus is lowered into the pool of the nuclear reactor 200 with subsequent additions of handling pole segments, the length of each being up to ten feet, until the jet pump inspection apparatus reaches a docking elevation near the jet pump inlet 204 (e.g., about 50-60 feet from the pool surface).

A camera system (not shown) may be used by the technician for viewing the end of the apparatus, e.g., the guide latch 16, while manipulating the handling poles to guide the apparatus until mated to the lip of the inlet 204. Once the apparatus is on the lip, the technician will notify the operator of the console 200 to engage the latching function of the guide latch 16. After the latching function is visually verified with the camera in the engaged state, the technician will notify the operator of the console 200 that calibration may commence through the inline calibration standard. Once the calibration is complete, the operator will instruct the console 200 to drive the probe cable down from the bottom of the guide latch 16 into the jet pump 202 and to the lowermost weld 206 to commence ultrasonic interrogation of all the welds contained in the jet pump 202. The operator sets the motion controls or parameters for the console 200 to commence scanning (e.g. the elevation to scan, how fast to scan, etc.).

It will be understood that the present invention provides for a remotely controlled apparatus used for the inspection of a jet pump of a boiling water reactor. It should be understood that all such modifications and improvements have been deleted herein for the sake of conciseness and readability but are properly within the scope of the following claims.

What is claimed is:

1. A jet pump inspection apparatus comprising:
a body;
a probe driver configured to provide axial movement of a probe along a length of the apparatus; and
a guide funnel configured to guide the probe into the apparatus to a given depth,
wherein the probe driver and the guide funnel are located on the body.

2. The jet pump inspection apparatus of claim 1, wherein the body includes a calibration tube portion, further comprising:

a pole attachment connected to the probe driver on the body above the calibration tube portion, the pole attachment configured to connect to at least one handling pole; and a guide latch on the body below the calibration tube portion, the guide latch configured to secure the apparatus to a jet pump.

3. The jet pump inspection apparatus of claim 2, wherein the guide latch and the body are detachably attached by the calibration tube.

4. The jet pump inspection apparatus of claim 1, wherein the probe driver includes a set of wheels configured to contact a cable including a probe head in order to control a location of the probe head within the body.

5. The jet pump inspection apparatus of claim 2, wherein a thickness of a plate of the pole attachment is up to one-half an inch.

6. The jet pump inspection apparatus of claim 2, wherein the body is made of aluminum.

7. The jet pump inspection apparatus of claim 2, wherein the guide latch is an air-actuated clamp configured to secure the apparatus to a jet pump.

8. The jet pump inspection apparatus of claim 7, wherein the guide latch further comprises:

one or more engagement members including a gap therebetween; and a latching actuator configured to engage at least one of the engagement members to clamp an object or surface in the gap.

9. The jet pump inspection apparatus of claim 1, wherein the probe driver includes an encoder configured to determine a location of a probe head.

10. The jet pump inspection apparatus of claim 9, wherein the probe driver is configured to control an elevation of the probe head based on the location established by the encoder.

11. A jet pump inspection apparatus comprising:

a body having a calibration tube portion;

a probe driver on the body above the calibration tube portion, the probe driver configured to provide axial movement of a probe along a length of the apparatus;

a pole attachment connected to the probe driver and configured to connect to the at least one handling pole;

a guide funnel on the body above the calibration tube portion and below the probe driver, the guide funnel configured to guide the probe into the jet pump inspection apparatus to a given depth; and a guide latch on the body below the calibration tube portion, the guide latch configured to secure the apparatus to a jet pump inlet.

12. The jet pump inspection apparatus of claim 11, wherein the probe driver includes an encoder configured to determine a location of a probe head.

13. The jet pump inspection apparatus of claim 12, wherein the probe driver is configured to control an elevation of the probe head based on the location established by the encoder.

14. The jet pump inspection apparatus of claim 11, wherein the guide latch and the body are detachably attached by the calibration tube.

15. The jet pump inspection apparatus of claim 11, wherein the probe driver includes a set of wheels configured to contact a cable including a probe head in order to control a location of the probe head within the body.

16. The jet pump inspection apparatus of claim 11, wherein a thickness of a plate of the pole attachment is up to one-half an inch.

17. The jet pump inspection apparatus of claim 11, wherein the body is made of aluminum.

18. The jet pump inspection apparatus of claim 11, wherein the guide latch is an air-actuated clamp configured to secure the apparatus to a jet pump.

19. The jet pump inspection apparatus of claim 18, wherein the guide latch further comprises:

one or more engagement members including a gap therebetween; and a latching actuator configured to engage at least one of the engagement members to clamp an object or surface in the gap.

* * * * *